United States Patent [19]
Graf et al.

[11] Patent Number: 5,669,839
[45] Date of Patent: Sep. 23, 1997

[54] METHOD OF METERING A FLOWABLE LUBRICANT OF A CHAIN DRIVE

[75] Inventors: Walter Graf, Euerdorf; Ulrich Immisch, Bed Kissingen; Anton May, Burkardroth, all of Germany

[73] Assignee: Satzinger GmbH & Co., Euerdorf, Germany

[21] Appl. No.: 594,243

[22] Filed: Jan. 30, 1996

[30] Foreign Application Priority Data

Feb. 7, 1995 [DE] Germany ............ 195 03 861.4

[51] Int. Cl.⁶ .................... F16H 57/04; F16N 7/24; F16N 13/22
[52] U.S. Cl. .................... 474/91; 184/15.2; 184/15.3
[58] Field of Search ................ 474/91, 43, 44, 474/45; 184/6.4, 15.1, 15.2, 15.3; 305/117, 118, 119

[56] References Cited

U.S. PATENT DOCUMENTS

| | | | |
|---|---|---|---|
| 3,707,203 | 12/1972 | Roberts | 184/6.4 |
| 4,674,030 | 6/1987 | Gabriel et al. | 364/184 |
| 5,253,984 | 10/1993 | Gruett et al. | 417/401 |
| 5,381,874 | 1/1995 | Hadank et al. | 184/6.4 |
| 5,447,127 | 9/1995 | Luck et al. | 123/90.31 |

*Primary Examiner*—Tamara L. Graysay
*Assistant Examiner*—Gary S. Hartmann
*Attorney, Agent, or Firm*—Herbert Dubno

[57] ABSTRACT

A flowable lubricant is metered in pulses to a chain drive under the control of the computer programmed to respond to measurement of the chain drive speed so that, when the speed of the chain drive is below a threshold level above which centrifugal force can cause loss of lubricant, the lubricant can flow in pulses to the chain drive. When, however, the speed of the chain drive rises to the threshold value, the pulse dispenser is blocked and the supply of lubricant pulses is terminated. The lubricant pulses which are not supplied during the interval are stored. When pulse supply of lubrication is restored, the stored lubricant pulses are supplied.

16 Claims, 2 Drawing Sheets

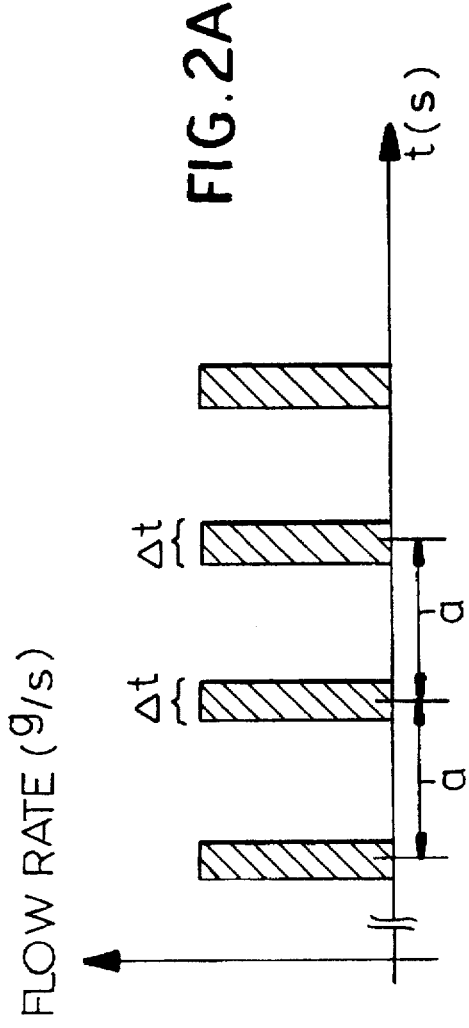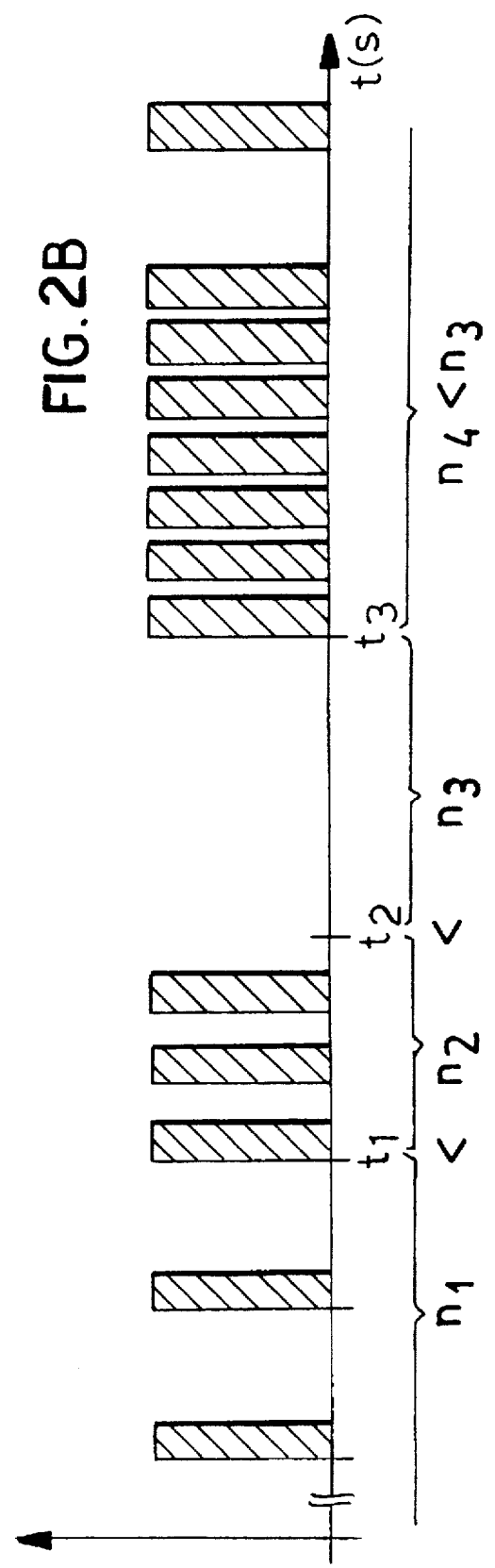

METHOD OF METERING A FLOWABLE LUBRICANT OF A CHAIN DRIVE

SPECIFICATION

1. Field of the Invention

Our present invention relates to a method of metering a flowable lubricant to a chain drive, the chain drive having at least one chain element passing around a sprocket element or wheel. More particularly the invention relates to the operation of an apparatus or device which utilizes a pulse metering dispensing of the lubricant fluid and a controller for the lubricant fluid.

2. Background of the Invention

A system utilizing a dispenser which is capable of metering incremental quantities or pulsed quantities of a lubricant to a chain drive is known, for example, from German patent document DE 42 41 073 C1 and the literature cited therein. The lubricant generally has a temperature-dependent viscosity which can be between 0.4 and 20,000 CPS. The dispenser is pulsed by a controller and, in turn, issues a pulsed quantity of the lubricant. Each lubricant pulse can have a certain volume and, by varying the pulsing rate or generating the pulses with a predetermined pulse interval (constant pulse rate) or with a variable pulse spacing (variable pulse rate), the lubricant fluid can be supplied at the constant rate or the variable rate to the chain drive. The pulse timing can be determined by the viscosity of the lubricant.

The control of the pulse metering system can be time dependent or dependent upon parameters which describe the operating state of the machine with which the chain drive is associated or which describe the operating state of the chain drive itself.

For the lubrication to be effective, the requisite lubricant quality must be fed to the chain drive and must be retained by the chain drive so that the lubricant supplied can continue to be effective in the lubrication process. Only when the lubricant is "consumed" is it required to add more lubricant. The problem of retention of the lubricant is particularly pronounced when the speed of the chain drive can vary, as is the case in many industrial applications of chain drives. The problem is particularly pronounced when the chain drive is associated with a motor-driven wheel which can operate at peripheral speeds and from several km/h to 200 km/h or more.

In such cases loss of lubricant from the train chain drive can be significant and often is unpredictable.

OBJECTS OF THE INVENTION

It is the principal object of the present invention to provide an improved method or process for the metered lubrication of a chain drive which not only will guarantee sufficient lubrication and reliable lubrications, but which also will afford reliable lubrication with a chain drive operating under greatly varying speeds.

Another object of the invention is to reduce or eliminate the problem of loss of lubricant in variable speed chain drives in an economical and effective manner.

Another object is to provide a chain drive lubrication method whereby drawbacks of earlier systems are avoided.

SUMMARY OF THE INVENTION

These objects and others which will become apparent hereinafter are attained, according to the invention, in a lubrication system for a chain drive having at least one chain element passing around at least one sprocket wheel element and in which the lubrication device or apparatus has at least one dispenser for pulses of the lubricant and a control unit for this dispenser.

According to the invention:

1.1 the lubricant fluid is dispensed onto the chain and/or onto the sprocket wheel;

1.2 the number of rotations of the chain drive per second are measured and fed as a signal to a computer which operates upon the control unit for the pulsed metering dispenser;

1.3 the computer activates the pulse metering system upon the measurement of predetermined number of revolutions, and 1.4 the computer blocks the pulsed metering system when the measured number n of revolutions of the sprocket wheel per second derived from the computer reaches an upper threshold proportional to the centrifugal force at the sprocket wheel, whereby the number of revolutions n per second is programmable and the threshold is so selected that the sprocket wheel operates so as to preclude flinging off the supplied lubricant fluid.

According to the invention a condition for problem-free lubrication of the chain drive is that the lubricant is so fed to the chain drive that it is fully effective. This is achieved under conditions in which the lubricant is added such that it is not immediately thrown off the chain drive.

According to the invention, therefore, it is not sufficient only to meter the lubricant fluid in a pulsed manner to the drive and in a manner which will reflect any changes in speed of the drive, i.e. with an increasing number of pulses per unit time with increasing speed, but also under conditions such that the centrifugal force developed at the sprocket wheel does not throw off and thereby render ineffective applied lubricant. The result of the invention is achieved by disabling the pulsed feed of the lubricant when the measured speed approaches the speed at which centrifugal force which will be effective to cast off the lubricant, i.e. the aforementioned threshold.

The threshold, of course, is a speed which corresponds to that which will produce a centrifugal force at which the lubricant is flung from the drive. The lubrication system of the invention, therefore, operates free from any loss of lubricant by centrifugal force and regardless of the viscosity of the lubricant. For example, the threshold can be set so that it is effective to terminate the metered supply of lubricant pulses for the lowest viscosity and a particular lubricant or of the lowest viscosity lubricant which may be used within the operating temperature range.

Since there is a clear relationship between the angular velocity of the sprocket wheel on the one hand and the number of revolutions n per second on the other, the objects of the invention can be attained in a process for the metered lubrication of the chain drive in which:

2.1 the lubricant is dispensed on the chain and/or the sprocket wheel;

2.2 the angular velocity of the sprocket wheel and the number of revolutions of the sprocket wheel are measured;

2.3 the measured values of the angular velocity and the number of revolutions of the sprocket wheel are fed to a computer which operates upon the control device for the pulsed metering system;

2.4 the computer activates the pulsed metering system after a predetermined number of revolutions; and 2.5 the computer blocks the pulsed metering system when the measured value of the angular velocity reaches an upper threshold, the number of revolutions being programmable and the threshold being so selected that the chain drive operates free from centrifugal force loss of the lubricant metered to the drive.

In both of these approaches, according to a preferred embodiment of the invention, the computer is programmed (points 1.4 and 2.5) to block the lubricant pulses when the chain drive is operated at a speed which would tend to fling off the lubricant by centrifugal force. According to the invention, moreover, the blocked lubricant pulses are stored (or, as stated more accurately, signals representing the blocked lubricant pulses are stored by the programming computer) so that the chain drive again operates below the threshold value and the pulsed dispenser is once again operating, the stored pulses of lubricant are supplied, preferably as superimposed upon the pulse which would normally be supplied at that speed of the chain drive.

In a preferred embodiment of the invention, the pulsed dispenser operates with constant volume pulses of the lubricant. This can be easily achieved by utilizing a piston pump as the metering unit and by controlling the piston stroke so that the volume per pulse is held constant. This allows, after a predetermined number of revolutions, a multiplicity of lubricant pulses to be dispensed.

Time-controlled pulses can also be used and in that case the pulse spacing can be varied in accordance with the speed of the chain drive while the pulse duration is varied in accordance with the viscosity of the lubricant fluid and its temperature dependency. The computer is correspondingly programmed.

According to the invention, moreover, a temperature measurement can be carried out and the temperature in the region of the chain drive supplied to the computer. The programming can be built into a firmware computer, which, in turn, can form part of the controller and/or the metering unit with the programming being carried out either on fabrication or upon installation of the unit. Alternatively the volume of the lubricant is spent and the unit time can be varied by, for example, the volume rate of flow of the lubricant and/or the pulse duration.

The method of the invention ensures that the lubricant can be supplied to the chain drive without being thrown off by centrifugal force and the threshold can be determined theoretically based upon viscosity, mass and surface tension or experimentally using the chain drive itself and varying the speed thereof or a model of the chain drive. The threshold is viscosity-dependent and, for lubricant fluids of different viscosity, is lubricant-dependent. The viscosity itself is, as has already been indicated, temperature-dependent.

While in general the thresholds can be located for an average viscosity of a certain lubricant fluid, best results are obtained when the threshold is selected for the lowest viscosity of the lubricant fluid in the working temperature range.

The temperature of the lubricant fluid, the apparatus, the chain drive or, for example, for motor-driven wheels, as for example in the chain drives of motorcycles, can be measured, although in the latter case, it may be desirable to measure only the ambient temperature and to supply the temperature to the computer which has already been programmed with the threshold values for the lubricant at different temperatures. The critical centrifugal force at which the lubricant may be cast off thus has a temperature factor which is taken into consideration with the invention by considering the temperature variation of the viscosity.

The method of the invention can thus comprise:

(a) dispensing a lubricant fluid in pulsed incremental quantities onto at least one of the elements during operation of the drive and rotation of the sprocket element;

(b) measuring rotation of the sprocket element and controlling pulsing of the dispensing of the lubricant fluid in accordance with the measured rotation;

(c) metering the pulsed dispensing of the lubricant fluid in accordance with a number of rotations of the sprocket element; and (d) terminating the dispensing of the lubricant fluid in pulsed incremental quantities onto the one of the elements in response to a measurement of the rotation signalling a threshold speed above which the lubricant fluid tends to be centrifugally flung from the elements.

In this method in step (b), a number of revolutions of the sprocket element is measured and in step (d) the threshold is programmed into a computer in terms of a number of revolutions per second corresponding to a maximum centrifugal force at which the lubricant fluid remains on the drive, the computer automatically initiating dispensing of the lubricant fluid in pulsed incremental quantities and terminating dispensing of the lubricant fluid in pulsed incremental quantities.

Further, a dispensing can be activated for dispensing of the lubricant fluid in pulsed incremental quantities in response to the measured rotation, i.e. in a pulse of lubricant for a predetermined number of the revolutions.

The computer can be programmed in accordance with points 1.4 or 2.5 above to store the blocked pulses and then utilize the blocked pulses when the chain drive speed falls below the threshold. The computer can be programmed to be responsive to a group of lubricant fluids of different viscosity and/or different temperature dependencies of the viscosity, e.g. as experimentally determined.

BRIEF DESCRIPTION OF THE DRAWING

The above and other objects, features, and advantages will become more readily apparent from the following description, reference being made to the accompanying drawing in which:

FIG. 2A is a graph showing the lubricant pulses, time being plotted along the abscissa versus flow volume along the ordinate; and FIG. 2B is a graph similar to FIG. 2A but illustrating blocking of the dispenser followed by a restoration of the stored pulses.

SPECIFIC DESCRIPTION

Figure 1:
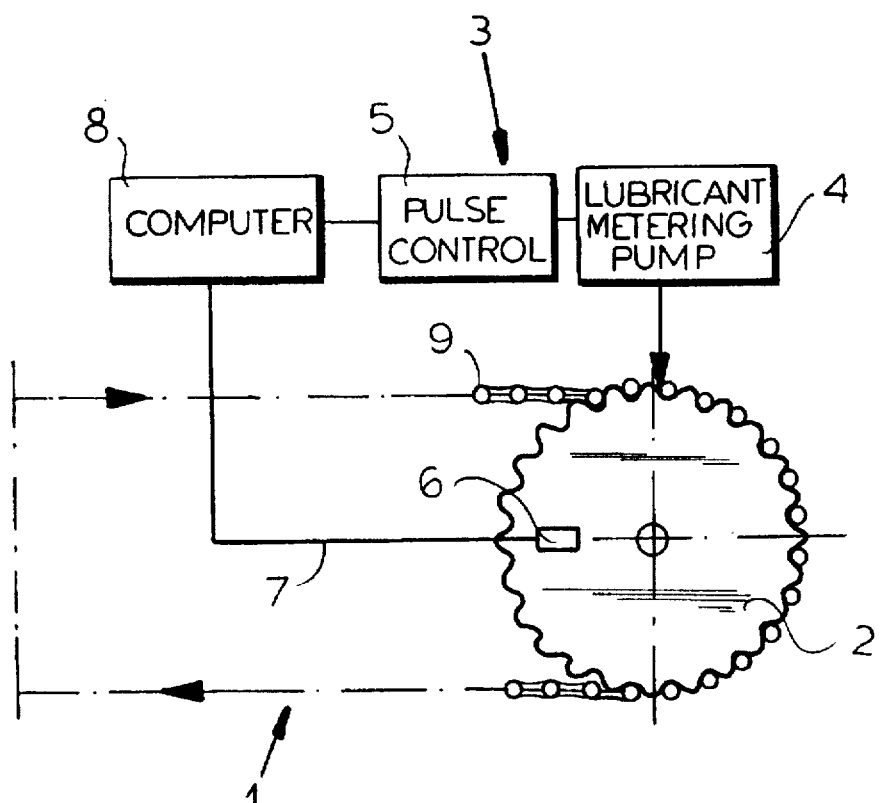
FIG. 1 is a diagram illustrating a chain drive and a dispensing system according to the invention for the lubricant.

FIG. 1 shows a chain drive 1 having a sprocket wheel 2 and a chain 9 passing around the sprocket wheel 2. Juxtaposed with the chain drive 1 is an apparatus 3 for the dispensing of pulsed increments of an lubrication fluid. This apparatus 3 comprises the dispenser 4, a controller 5 for the dispenser and a computer 8. In the embodiment of FIG. 1, the dispenser 4 delivers the lubricant increments to the sprocket wheel 2 at the region that the chain 9 initially engages it.

It can be seen from FIG. 1 that the number of rotations and/or the angular velocity can be determined by a sensor 6 responsive to rotation of the sprocket wheel. The measured value is delivered via lines 7 to the computer 6 which operates the control unit 5, the latter triggering the dispensing of the lubricant fluid in pulses.

Figure 1B:
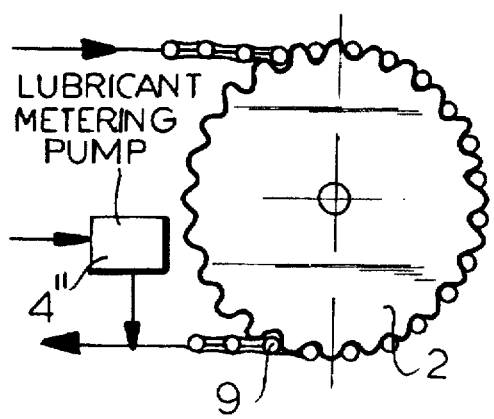
FIG. 1B is a view similar to FIG. 1A of another modification.
Figure 1A:
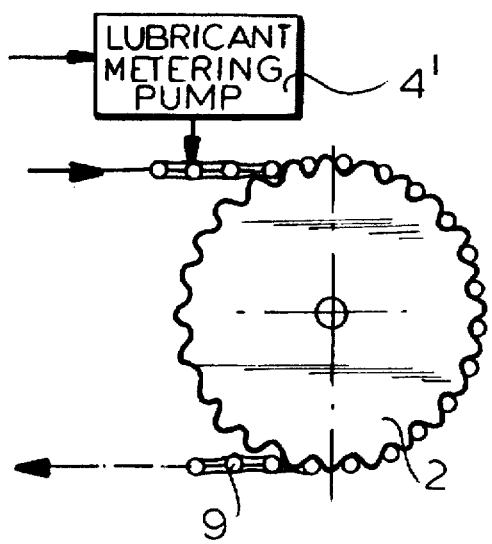
FIG. 1A is a partial illustration of a modified system otherwise similar to that of FIG. 1.

In FIG. 1A, the lubricant metering pump 4' is shown to deliver the lubricant to the chain 9 before it reaches the sprocket wheel 2, i.e. upstream of the sprocket wheel while FIG. 1B shows a lubricant metering pump 4" supplying the lubricant to the chain 9 immediately downstream of the sprocket wheel 2.

FIGS. 2A and 2B are graphic illustrations in which time has been plotted along the abscissa against a quantity of the lubricant plotted along the ordinate. The graphs show a pulsed metering of the lubricant fluid to the chain drive. The pulse duration is represented at $\gamma t$ and the pulse spacing is shown at a. The rectangular areas of each pulse represent the volume delivered per pulse.

FIG. 2A shows a chain drive which the sprocket wheel 2 operates with a constant speed, i.e. a constant number of rotations $n_1$ per unit time, e.g. a second. In FIG. 2B, the speed has increased to a rotation number $n_2$ per unit time at the beginning of the time interval $t_1$, the number of pulses per unit time being increased as well, by a reduction of the pulse spacing a. At the time $t_2$, the speed of the chain drive is so great that the threshold at which centrifugal loss of lubricant can occur and the pulsed dosing system is thus blocked between the times $t_2$ and $t_3$, therefore no pulses of the lubricant fluid are supplied.

When the speed falls back below the threshold at the time $t_3$, the store pulses which were not supplied because of the blocking of the dispenser are supplied again, superimposed upon the normal pulses, i.e. beginning at $t_3$ and where the speed $n_4$ per unit time is below the threshold. When the stored pulses have been supplied, normal pulsing is restored (right-hand end of FIG. 2B).

We claim:

1. A method of metering a flowable lubricant to a chain drive having a sprocket element and a chain element passing around said sprocket element, said method comprising the steps of:
    (a) dispensing a lubricant fluid in pulsed incremental quantities onto at least one of said elements during operation of said drive and rotation of said sprocket element;
    (b) measuring rotation of said sprocket element and controlling pulsing of the dispensing of the lubricant fluid in accordance with the measured rotation; and
    (c) terminating the dispensing of the lubricant fluid in pulsed incremental quantities onto said one of said elements in response to a measurement of said rotation signalling a threshold speed above which said lubricant fluid tends to be centrifugally flung from said elements.

2. The method defined in claim 1 wherein, in step (b), a number of revolutions of the sprocket element is measured and in step (c) the threshold is programmed into a computer in terms of a number of revolutions per second corresponding to a maximum centrifugal force at which said lubricant fluid remains on said drive, said computer automatically initiating dispensing of the lubricant fluid in pulsed incremental quantities and terminating dispensing of the lubricant fluid in pulsed incremental quantities.

3. The method defined in claim 2, further comprising activating a dispenser for dispensing of the lubricant fluid in pulsed incremental quantities in response to the measured rotation upon detection of a predetermined number of said revolutions.

4. The method defined in claim 2, further comprising storing by programming of said computer a signal representing a number of pulsed incremental quantities blocked by terminating the dispensing of the lubricant fluid in step (c), and thereafter dispensing said number of pulsed incremental quantities to said drive when the measured number of revolutions per second falls below said threshold.

5. The method defined in claim 2 wherein said threshold is set to correspond to the maximum centrifugal force at which said lubricant fluid remains on said drive for the lowest viscosity of the said lubricant fluid in a working temperature range thereof.

6. The method defined in claim 5, further comprising the step of programming said computer with data for a plurality of lubricant fluids of different viscosities and different temperature dependencies of viscosity.

7. The method defined in claim 2 wherein said lubricant fluid is dispensed onto said chain element ahead of passage of the chain element onto said sprocket element.

8. The method defined in claim 2 wherein said lubricant fluid is dispensed onto said one of said elements where said chain element passes onto said sprocket element.

9. The method defined in claim 2 wherein said lubricant fluid is dispensed onto said chain element upon passage of the chain element from the sprocket element.

10. A method of operating a device for metering a lubricant fluid to a chain drive having a sprocket element and a chain element passing around said sprocket element, said device comprising a dispenser for dispensing of the lubricant fluid in pulsed incremental quantities, and a controller for said dispenser, said method comprising the steps of:
    (a) dispensing a lubricant fluid in pulsed incremental quantities from said dispenser onto at least one of said elements during operation of said drive and rotation of said sprocket element;
    (b) measuring angular velocity and a number of revolutions of said sprocket element;
    (c) feeding measured values of said angular velocity and said number of revolutions to a computer and operating said controller with said computer to control pulsing of the dispensing of the lubricant fluid;
    (d) activating said dispenser by said computer in accordance with the measured number of revolutions; and
    (e) blocking operation of said dispenser and terminating the dispensing of the lubricant fluid in pulsed incremental quantities onto said one of said elements in response to a measurement of said rotation upon measurement of an angular velocity reaching a threshold speed above which said lubricant fluid tends to be centrifugally flung from said elements whereby the number of revolutions and the threshold speed are programmed into said computer to maintain operation of said drive free from centrifugal loss of lubricant fluid.

11. The method defined in claim 10, further comprising storing by programming of said computer a signal representing a number of pulsed incremental quantities blocked by terminating the dispensing of the lubricant fluid in step (e), and thereafter dispensing said number of pulsed incremental quantities to said drive when the measured number of revolutions per second falls below said threshold.

12. The method defined in claim 10 wherein said threshold is set to correspond to the maximum centrifugal force at which said lubricant fluid remains on said drive for the lowest viscosity of the said lubricant fluid in a working temperature range thereof.

13. The method defined in claim 12, further comprising the step of programming said computer with data for a plurality of lubricant fluids of different viscosities and different temperature dependencies of viscosity.

14. The method defined in claim 10 wherein said lubricant fluid is dispensed onto said chain element ahead of passage of the chain element onto said sprocket element.

15. The method defined in claim 10 wherein said lubricant fluid is dispensed onto said one of said elements where said chain element passes onto said sprocket element.

16. The method defined in claim 10 wherein said lubricant fluid is dispensed onto said chain element upon passage of the chain element from the sprocket element.

\* \* \* \* \*